United States Patent
Braun et al.

(10) Patent No.: US 6,604,024 B2
(45) Date of Patent: Aug. 5, 2003

(54) METHOD FOR PROTECTING A MICROCOMPUTER OF A CONTROL UNIT AGAINST THE MANIPULATION OF A PROGRAM AND A DEVICE FOR CARRYING OUT THE METHOD

(75) Inventors: Guenter Braun, Bietigheim (DE); Alireza Djahangard-Mahboob, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/766,103

(22) Filed: Jan. 19, 2001

(65) Prior Publication Data

US 2001/0021886 A1 Sep. 13, 2001

(30) Foreign Application Priority Data

Jan. 19, 2000 (DE) .......................................... 100 02 204

(51) Int. Cl.$^7$ ............................................... G06F 19/00
(52) U.S. Cl. ........................................... 701/1; 713/200
(58) Field of Search .................................. 701/1, 29, 36; 709/203; 711/115, 211; 713/187, 189, 191, 200; 455/456

(56) References Cited

U.S. PATENT DOCUMENTS

| | | | | |
|---|---|---|---|---|
| 5,406,484 A | * | 4/1995 | Wurzenberger | 455/456 |
| 5,717,387 A | * | 2/1998 | Suman et al. | 701/36 |
| 5,787,367 A | * | 7/1998 | Berra | 701/1 |
| 5,790,664 A | * | 8/1998 | Coley et al. | 709/203 |
| 5,802,485 A | * | 9/1998 | Koelle et al. | 701/209 |
| 2001/0025347 A1 | * | 9/2001 | Thomas et al. | 713/200 |

FOREIGN PATENT DOCUMENTS

DE 197 23 332 9/1998

* cited by examiner

Primary Examiner—Gary Chin
(74) Attorney, Agent, or Firm—Kenyon & Kenyon

(57) ABSTRACT

A method for protecting a microcomputer of a control unit for a motor vehicle against the manipulation of a control program that is stored at least partially in a rewriteable memory, by executing a validation program stored in the microcomputer for detecting an unauthorized manipulation of the control program. In order to make possible a simple deactivation of the validation program without impairing the security of the validation program, an electronic hardware identifier of the control unit is provided for identifying the control unit as a serial module or as application module, the validation program being able to be switched from an activated state to a deactivated state in the application module using standard commands and in a serial module only using special measures. The standard commands are freely available, whereas the special measures are available on a limited basis.

10 Claims, 3 Drawing Sheets

METHOD FOR PROTECTING A MICROCOMPUTER OF A CONTROL UNIT AGAINST THE MANIPULATION OF A PROGRAM AND A DEVICE FOR CARRYING OUT THE METHOD

FIELD OF THE INVENTION

The present invention relates to a method for protecting a microcomputer of a control unit for a motor vehicle against the manipulation of a control program stored at least partially in a rewriteable memory of the microcomputer, by executing a validation program stored in the microcomputer for detecting an unauthorized manipulation of the control program. The present invention additionally relates to a control unit for a motor vehicle, having a microcomputer which has a rewriteable memory, in which a control program can at least partially be stored, and on which a validation program can be executed for protecting the microcomputer against the manipulation of the control program.

BACKGROUND INFORMATION

A method of the type cited above is known, for example, from German Published Patent Application No. 197 23 332. In this document, a method is disclosed for protecting a microcomputer of a control unit for a motor vehicle, in which a validation program stored in the microcomputer is executed. In the context of the validation program, a code word is formed from at least one part of the memory contents of a rewriteable memory of the microcomputer using a predetermined key, which is stored in the microcomputer. The code word is compared with a comparison word that is stored in the rewriteable memory. Subsequent to a programming or reprogramming of the rewriteable memory, the comparison word is stored in the memory on the basis of knowledge of the key and of the memory contents of the rewriteable memory. This method for protecting the microcomputer against the manipulation of its control program is standardized in ISO 14230. The key is dependent on the manufacturer and as a rule is only known to the manufacturer (for programming the control unit) and to authorized dealers (for reprogramming the control unit in the context of software updates). The method is also designated as the seed-and-key method.

In the event that the rewriteable memory is reprogrammed by an unauthorized party, the latter, after the reprogramming, must in any case create a comparison word and store it in the rewriteable memory. In the context of the validation program, a code word is formed as a function of the key and of the memory contents of the reprogrammed rewriteable memory, and it is compared with the stored comparison word. Since the unauthorized party as a rule does not know the key of the microcomputer, the comparison word is most likely invalid and does not agree with the code word. In this manner, the unauthorized manipulation of the control program is detected.

However, it can sometimes be necessary or useful to deactivate the validation program in order, after every reprogramming of the rewriteable memory, not to have to create a comparison word from the memory contents and from the key and to store it in the rewriteable memory. This is the case, for example, when the control unit must frequently be reprogrammed, whether for development, examination, or testing purposes, especially in the initial phase of the development of the control unit or of the control program or for varying the settings in an internal combustion engine controlled by the control unit.

SUMMARY OF THE INVENTION

The present invention therefore is based on the objective of being able to temporarily deactivate a validation program stored in a microcomputer of a motor vehicle control unit without the deactivation of the validation program leading to the reduced protection of a control program stored in a rewriteable memory of the microcomputer.

For achieving this objective, on the basis of the method for protecting a microcomputer of a control unit of the type cited above, the present invention provides that the control units be subdivided into serial modules and application modules, which are distinguished one from the other by an electronic hardware identifier, the validation program being switched from an activated to a deactivated state in the application modules using standard commands and in the serial modules using special measures, as appropriate, only the standard commands being freely available.

According to the present invention, proceeding on the basis of the known software identifier of the seed-and-key method, a hardware identifier is provided as superstructure for deactivating the software identifier. On the basis of the electronic hardware identifier, the control unit itself acts as the information carrier for the query as to whether the unit is an application module or a serial module.

Usually, only as many control units are developed as there are application modules, such as are necessary for developing the control unit, the control program, or the internal combustion engine which is controlled by the control unit and the control program. The number and distribution of application modules is therefore sharply limited. The application modules are especially distinguished from serial modules by the fact that the validation programs can be switched between an activated and a deactivated state using standard commands that are freely available.

If the validation program is in an activated state, it is necessary, after every reprogramming of the rewriteable memory of the microcomputer, to determine a comparison word, to store it in the rewriteable memory, and to execute the software identifier. In a deactivated validation program, a reprogramming of the rewriteable memory can be repeated virtually an indefinite number of times without each time having to execute the software identifier. In contrast, the serial modules constitute by far the greatest number of control units. In the serial modules, the validation program can only be switched from an activated into a deactivated state using special measures, which are only available on a limited basis. The special measures are advantageously only known to the manufacturer of the control units.

The standard commands in the method according to the present invention correspond roughly to the deactivation code in the method known from the related art. However, the difference between the method according to the present invention and the related art lies in the fact that the number and distribution of application modules, in which alone the validation program can be switched from an activated into a deactivated state using standard commands, is sharply limited. On the other hand, the widely used serial modules can only be switched using the special measures which are not freely available.

The safety of the method according to the present invention can be increased even further by limiting the availability of the standard commands for switching the validation program in the application modules from an activated into the deactivated state. It is conceivable that the standard commands be known not only to the manufacturer of the control units but also to some few selected developers at customer sites and to the employees of some few selected authorized dealers of the customer. In addition, the distribution of the application modules can be precisely monitored and controlled.

According to one advantageous refinement of the present invention, the software identifier is based on the so-called seed-and-key method, a code word being formed, in the context of the validation program, from at least one part of the memory contents of the rewriteable memory with the assistance of a key, and the code word being compared with a comparison word stored in the rewriteable memory. This method is described in detail in German Published Patent Application No. 197 23 332.

According another embodiment of the present invention, it is provided that the validation program be switched from a deactivated to an activated state in the application modules and in the serial modules using standard commands. Since switching the validation program of a control unit into an activated state runs no danger of manipulating the control program of the control unit, this switching can be carried out by anyone, using standard commands.

According to a further embodiment of the present invention, it is provided that in the application modules the validation program be switched from the deactivated to a locked activated state using standard commands and from the locked activated state into the deactivated state using special measures.

According to this specific embodiment of the method according to the present invention, the application module can therefore be switched among three distinct states. In addition to the state having the simply activated (not locked) software identifier and the state having the deactivated software identifier, the application module can also be switched to a state having a locked activated software identifier. In this state, after the end of the application and development phase, the application module can be used as a normal serial module. From the state having the deactivated software identifier, the application module is switched using standard commands to the state having a locked activated software identifier. The application module can only exit from this state using special measures. The latter are only available on a limited basis, for example, only to the manufacturer of the control units. An unauthorized modification of the control program in the rewriteable memory of an application module, i.e., the state of the application module being switched in an unauthorized manner to the state having the deactivated software identifier, is therefore virtually impossible.

If the attempt is made in serial modules to switch the validation program from the deactivated to the simple activated (not locked) state using a standard command, the validation program according to a further embodiment of the present invention is automatically switched to the locked activated state. In this way, it is assured that the serial module, after the conclusion of a reprogramming of the control program, will in every case again be in the locked activated state in order to prevent an unauthorized manipulation of the control program.

According to an advantageous refinement of the present invention, it is provided that the standard commands for activating or deactivating the validation program be transmitted to the control unit via a communications interface. The communications interface is configured, for example, as a controller-area-network (CAN) bus or a K-line. For purposes of testing and diagnosis, it is known from the related art to arrange a K-line between the control unit and a diagnostic or testing device. Via a K-line, data are transmitted in accordance with the Key Word Protocol 2000 (ISO 14 230). This K-line is also used for transmitting the commands to switch the validation program between an activated and an inactivated state.

As a further means of achieving the objective of the present invention, it is provided, on the basis of the control unit of the type cited above, that the control unit have an electronic hardware identifier for identifying the control unit as a serial module or an application module, the validation program being switchable from an activated state into a deactivated state in an application module using standard commands and in a serial module using special measures, as appropriate, with the standard commands being freely available and the special measures being available on a limited basis.

The electronic hardware identifier can be configured as any electronic component of the circuitry of the control unit. The electronic component can be configured, for example, as an EPROM, an EEPROM, as a programmable logical device (PLD), as a programmable array logic (PAL), or as a GAL. The logic components (PLDs) can be programmed in varying ways for application modules and for serial modules. Externally, distinguishing between application modules and serial modules is only possible in the context of switching the validation program between an activated and deactivated state.

However, alternatively, according to one advantageous refinement of the present invention, it is provided that the electronic hardware identifier be configured as at least one additional electronic component integrated into the circuitry of the control unit. According to this refinement, application modules and serial modules are distinguished by circuitries having different inserted components. The differently inserted components of the circuitry can be achieved, for example, using resistors having different resistance values, using coils having different inductances, using capacitors having different capacitances, using additional resistors, inductances, or capacitors, using additional transistors, or using additional logic components.

DETAILED DESCRIPTION

The present invention relates to a method for protecting a micro-computer against unauthorized reprogramming. The microcomputer is a part of a control unit for controlling the internal combustion engine and/or other functions of a motor vehicle. These other functions are, for example, the anti-lock system, anti-spin regulation, electronic stability program, switching headlights on and off and orienting them, etc. The designations control unit and control program do not limit the function of the control unit to controlling specific functions of the motor vehicle. Rather, the control unit with the assistance of the control program can also take over regulation tasks, as can be readily determined by a worker skilled in the art.

Figure 1:
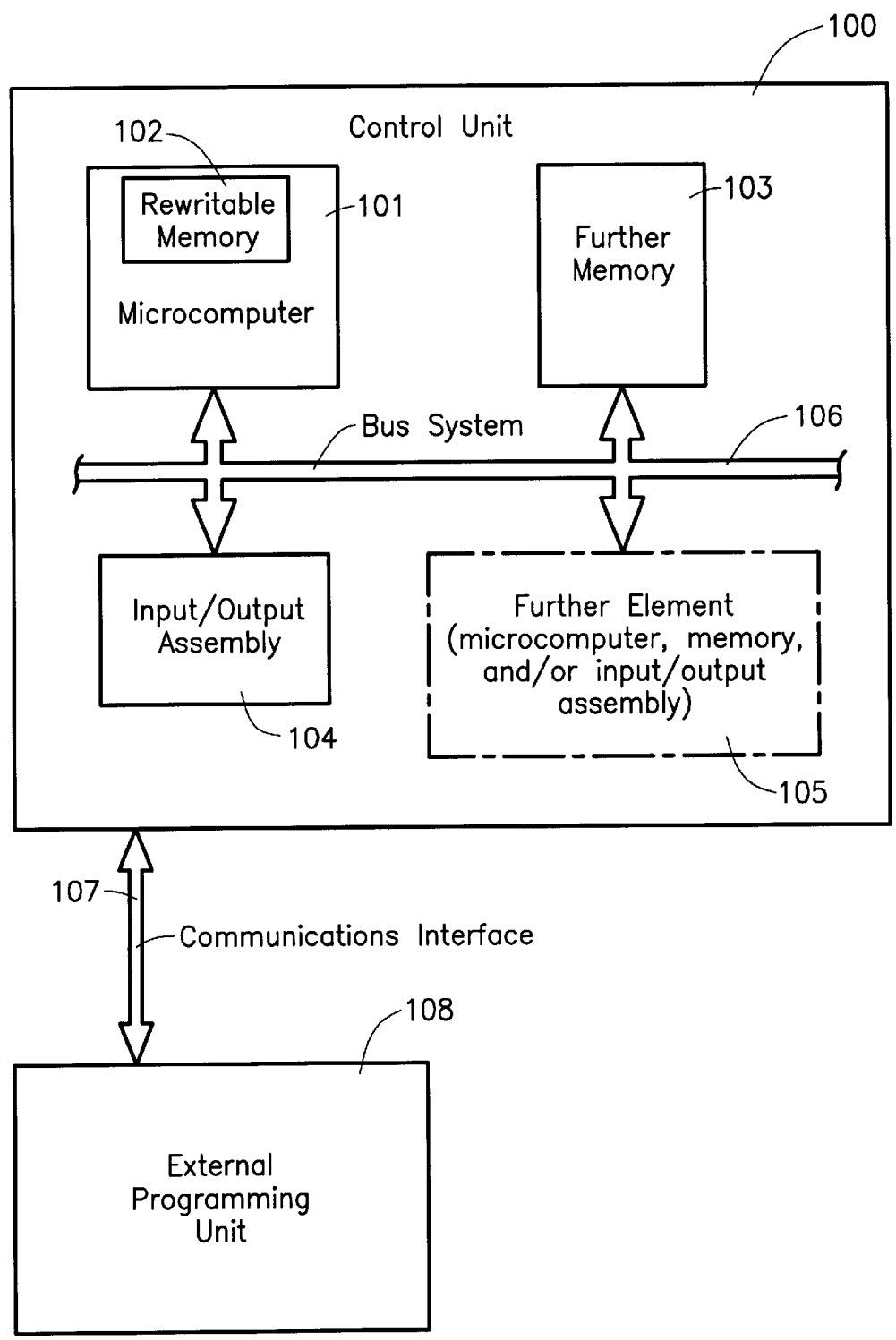
FIG. 1 depicts a control unit having a micro-computer and a rewriteable memory, optionally having a programming unit.

FIG. 1 depicts a control unit 100 having microcomputer 101 which includes a rewriteable memory 102. Control unit 100 can contain a further memory 103. In addition, optional further elements 105, such as further microcomputers, memories, input and output assemblies, etc., can be contained therein, in accordance with the makeup and model of control unit 100. The individual elements of the control unit are connected to each other by at least one bus system 106, internal to the control unit. Reference numeral 104 designates an input/output assembly for a communications interface 107, via which the control unit can communicate with external components. In particular, the programming and reprogramming of the control unit, especially with respect to memory 102 and/or memory 103, can be undertaken through this interface. This occurs, e.g., with the assistance of an external programming unit 108.

The microcomputer has a rewriteable memory, in which a control program is stored for carrying out the control tasks. The microcomputer is provided with a software identifier, in order to detect an unauthorized manipulation of the control program. The software identifier includes, for example, a validation program that is run after the reprogramming of the rewriteable memory of the microcomputer.

After programming or reprogramming the rewriteable memory using a new control program, first, a comparison word is formed from the memory contents of the rewriteable memory with the assistance of a key that is formed and stored in the microcomputer, and a comparison word is stored in the rewriteable memory. In the context of the validation program, a code word is then formed from at least one part of the memory contents of the rewriteable memory and from the key, and the code word is compared with the stored comparison word. The code word and the comparison word only agree if the same key was used when they were formed, i.e., if the key was known when the comparison word was formed. If the code word and the comparison word do not agree, then an unauthorized reprogramming of the control program is assumed and the control unit is locked. This method is termed the seed-and-key method.

However, under certain circumstances, it can be necessary or useful to deactivate the seed-and-key method in order to be able to reprogram the control unit multiple times one after the other without each time having to determine the comparison word and to store it in the rewriteable memory. The present invention proposes a method and a control unit, in which the seed-and-key method can be deactivated in a simple manner without as a result making it more difficult to detect an unauthorized manipulation of the control program, using the seed-and-key method in the activated state. As a result, it is possible, in the development phase of a control unit, to avoid the circumstance where tools having the seed-and-key method or the key of the seed-and-key method are distributed in great numbers among a multiplicity of persons. The method according to the present invention therefore leads to a reduction in the risk of a misuse of the tools or of the key.

The manufactured control units are first divided into application modules and serial modules. At the beginning of a production series, and as needed even in the middle of a production series, a limited number of control units is produced as application modules. The application modules differ from serial modules by having a different electronic hardware identifier. The electronic hardware identifier can be configured as at least one electronic component of any type in the circuitry of the control unit or as at least one additional electronic component of any type integrated into the circuitry of the control unit. As electronic components, resistors, coils, capacitors, or any other type of memory components or logic components can be considered. The state of the electronic hardware identifier can be queried only in the context of switching the validation program between the activated and the deactivated state. For this purpose, a communications interface, for example, a K-line, is connected to the external terminals of the control unit. The data transmission over the K-line occurs in accordance with the so-called Key Word Protocol 2000 (ISO 14230). The communications interface can also be configured as a Controller Area Network (CAN) bus.

Figure 2:
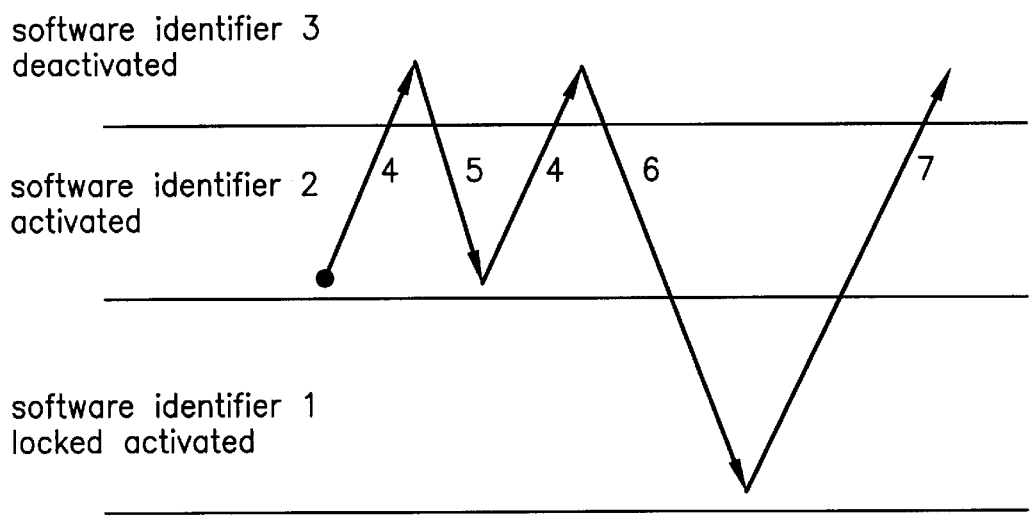
FIG. 2 depicts a method according to an embodiment of the present invention, based on the example of the application module.

According to the present invention, the control unit itself (i.e., the hardware of the control unit) is the information carrier for identifying the control unit as a serial module or as an application module. The application module has three states among which it can be switched (see FIG. 2). In a first state 1, the software identifier is activated in a locked manner. In a second state, the software identifier is simply activated, i.e., not in a locked manner. In a third state 3, the software identifier is deactivated. The delivery state of the application module is state 2, having the simple activated software identifier. In state 2, reprogramming of the control program can only be executed if the seed-and-key method is run for each reprogramming. In contrast to the manner depicted in FIG. 2, it is also possible to deliver the application module in state 3, having a deactivated software identifier.

From state 2, the application module can be switched to state 3 having a deactivated software identifier, with the assistance of a first standard command 4. As long as the application module is in this state 3, it can be reprogrammed virtually any number of times without the seed-and-key method having to be run after each reprogramming. After the termination of a development, examination, or testing phase, the application module, with the assistance of a second standard command 5, can again be switched to state 2 having the simple activated software identifier. From this state, the application module can at any time be switched again to state 3 using first standard command 4.

In the event that it can be determined that no further development, examination, or testing phase will be necessary, the application module can be switched from state 3, having a deactivated software identifier, to state 1, having the locked activated software identifier, with the assistance of a third standard command 6. In this state 1, reprogramming the control program is only possible by running the seed-and-key method subsequent to the reprogramming.

It is indeed theoretically possible to switch the application module from state 1 to state 3. However, for this purpose a special measure 7 is required, for example, a special command, which, in contrast to standard commands 4, 5, 6, is only available on a limited basis. It is advantageous if special command 7 is known, for example, only to the manufacturer of the control unit. In this manner, the number of persons having knowledge of special command 7 is so limited that a misuse or a communication of special command 7 to unauthorized persons is virtually excluded.

To increase the safety of the method according to the present invention, the availability of first standard command 4 can also be restricted, for example, to the manufacturer of the control units and the employees of customers. Then the danger of an unauthorized reprogramming of the control program can be reduced even if the application module is in simple activated state 2 and not in locked activated state 1.

Figure 3:
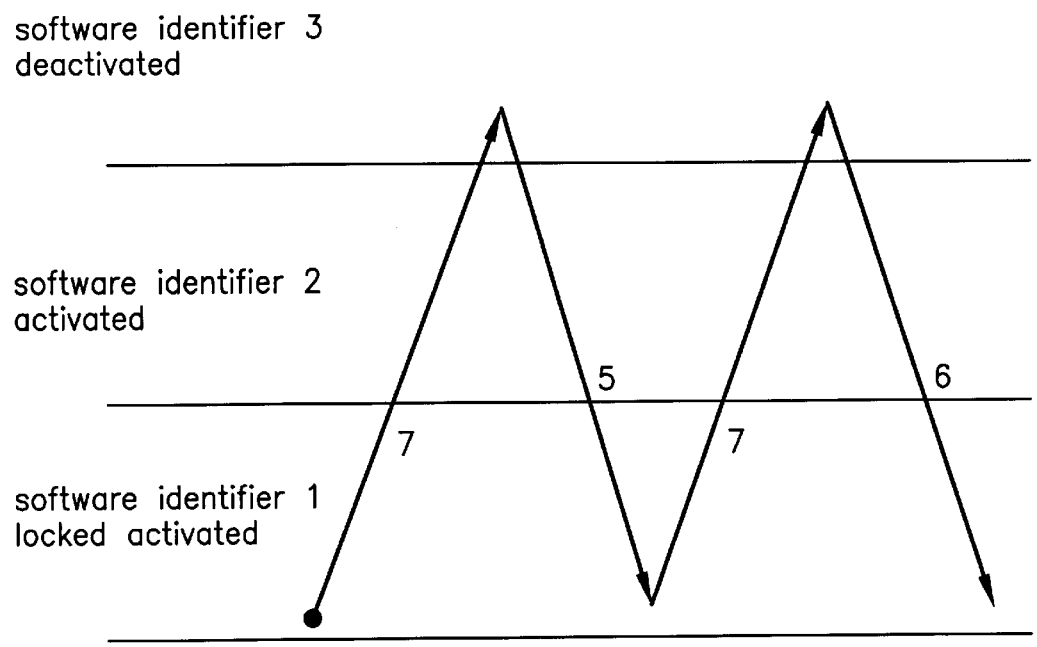
FIG. 3 depicts the method according to an embodiment of the present invention from FIG. 2, based on the example of a control unit.

In contrast to the application modules, the serial modules (see FIG. 3) are only provided with two states between which they can be switched. The serial modules are delivered in state 1, having the locked activated software identifier. From this state 1, they can be switched only to state 3 having the deactivated software identifier, using special command 7. If the attempt is made to switch the serial module from state 3 to state 2, having the simple activated software identifier, using second standard command 5, then, due to the hardware identifier, it will be detected that the present control unit is a serial module, which should not be switched to state 2. Using second standard command 5, the serial module is therefore not switched into state 2, having the simple activated software identifier, but rather to state 1, having the locked activated software identifier. The same effect can also be achieved using third standard command 6.

By switching the application modules to state 1, having the locked activated software identifier, the application modules, after the end of the development, examination, or testing phase, just as serial modules are, can be used as entirely normal control units. In this manner, the costs for the development of the control units can be reduced.

Figure 4:
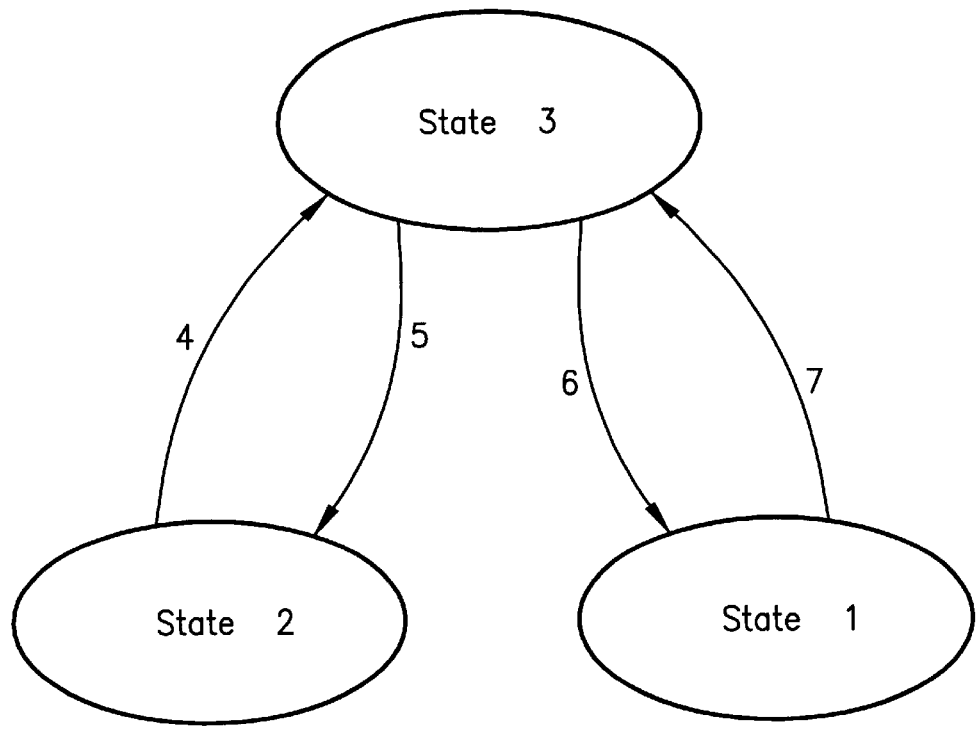
FIG. 4 depicts a state diagram of the method according to an embodiment of the present invention, in accordance with FIG. 2.
Figure 5:
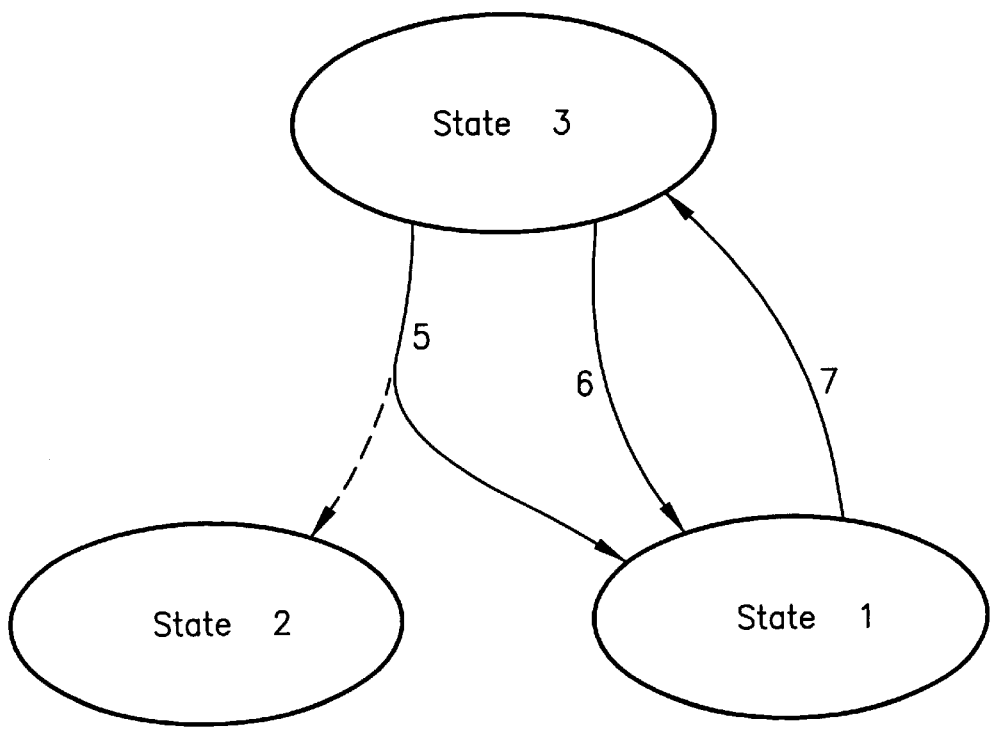
FIG. 5 depicts a state diagram of the method according to an embodiment of the present invention, in accordance with FIG. 3.

Standard commands 4, 5, 6 and special command 7 for activating or deactivating the software identifier are transmitted to the control unit, for example, via the K-line. In FIGS. 4 and 5, the state diagrams of an application module (FIG. 4) and of a serial module (FIG. 5) are depicted. It can clearly be seen that due to second standard command 5, for switching the control unit from state 3 into state 2 as a function of the hardware identifier, in the application module, it is switched to state 2 and in the serial module, it is switched to state 1.

What is claimed is:

1. A method for protecting a microcomputer of a control unit for a motor vehicle against the manipulation of a control program, the control program being at least partially stored in a rewriteable memory of the microcomputer, protection being provided through use of a validation program stored in the microcomputer for detecting an unauthorized manipulation of the control program, the method comprising the steps of:

classifying the control unit as one of a serial module and an application module, the serial module and the application module each including a hardware identifier, the hardware identifier of the serial module being distinguishable from the hardware identifier of the application module;

switching the validation program in the application module, when the control unit is classified as the application module, from an activated state to a deactivated state using standard commands; and switching the validation program in the serial module, when the control unit is classified as the serial module, from an activated state to a deactivated state using special measures.

2. The method of claim 1, further comprising the steps of:

forming a code word from at least one part of memory contents of the rewriteable memory using a key during use of the validation program; and comparing the code word with a comparison word stored in the rewriteable memory.

3. The method of claim 1, further comprising the steps of:

switching the validation program in at least one of the application modules and the serial modules from the deactivated state to the activated state using standard commands.

4. The method of claim 3, further comprising the steps of:

switching the validation program in the application module from the deactivated state to a locked activated state using said standard commands; and switching the validation program in the application module from the locked activated state to the deactivated state using said special measures.

5. The method of claim 1, further comprising the step of:

automatically switching the validation program, in the serial module, to a locked activated state in response to one of said standard commands for switching the validation program from the deactivated state to an unlocked activated state to assure that the serial module, after reprogramming of the control program, is in the locked activated state to prevent the unauthorized manipulation of the control program.

6. The method of claim 1, wherein the standard commands for activating and deactivating the validation program are transmitted to the control units via a communications interface.

7. The method of claim 1, wherein the serial module is a circuit with two states and the application module is a circuit with three states.

8. A control unit for a motor vehicle, comprising:

a microcomputer, the microcomputer including a rewriteable memory, in which a control program can be at least partially stored, the microcomputer capable of running a validation program for protecting the microcomputer against manipulation of the control program; and an electronic hardware identifier for identifying the control unit as one of a serial module and an application module;

wherein the validation program can be switched from an activated state to a deactivated state in the application module using standard commands and in the serial module using special measures.

9. The control unit of claim 8 wherein the electronic hardware identifier is configured as at least one additional electronic component integrated into circuitry of the control unit.

10. The control unit of claim 8, wherein the serial module is a circuit with two states and the application module is a circuit with three states.

* * * * *